March 25, 1958 B. M. RAY 2,828,363
CARRIER CURRENT COMMUNICATION SYSTEM
Filed Sept. 25, 1952
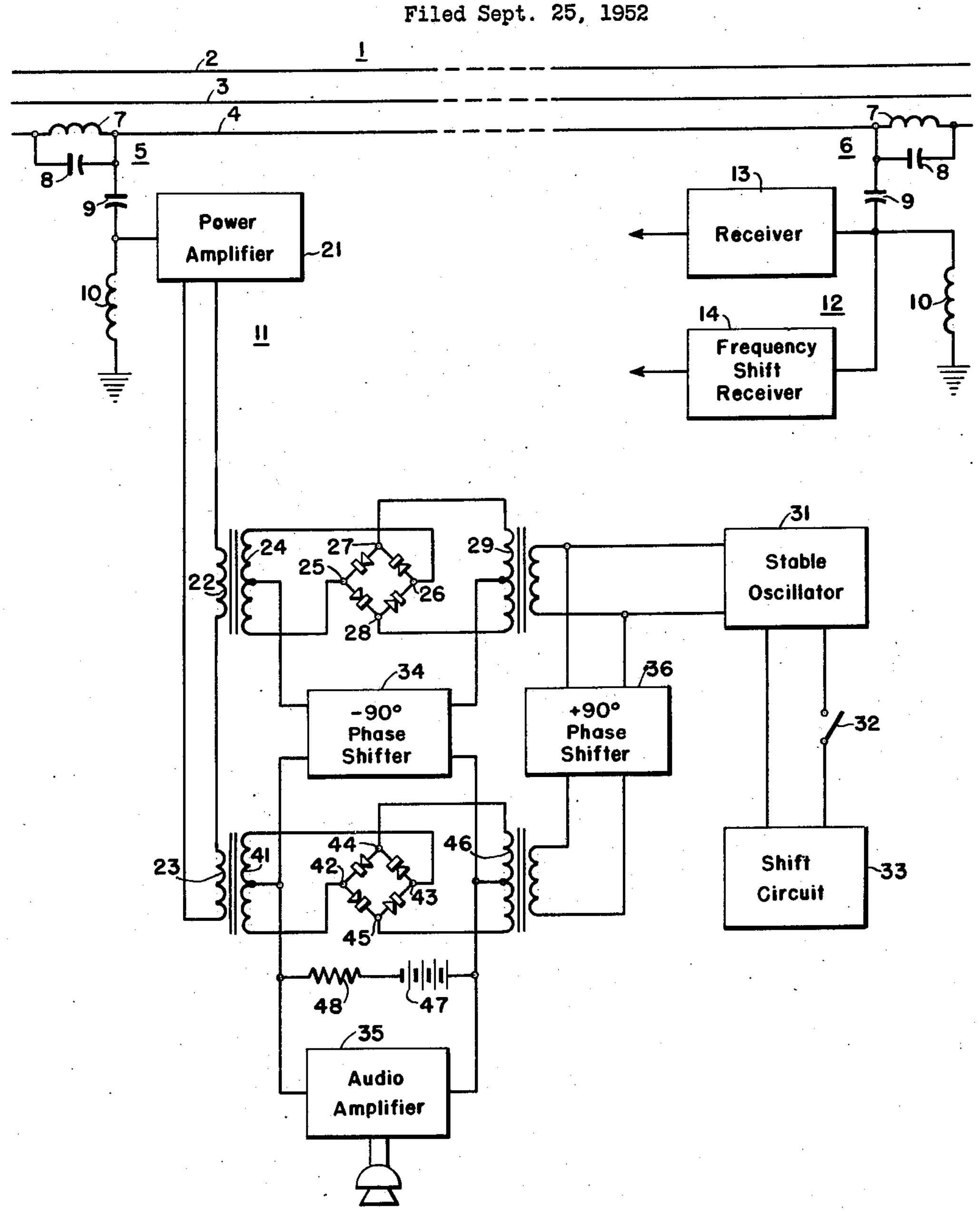
WITNESSES:
John E. Healy
Wm. T. Wofford
INVENTOR
Billy M. Ray.
BY F. E. Browder
ATTORNEY United States Patent Office 2,828,363

Patented Mar. 25, 1958

2,828,363

CARRIER CURRENT COMMUNICATION SYSTEM

Billy M. Ray, Baltimore, Md., assignor to Westinghouse Electric Corporation, East Pittsburgh, Pa., a corporation of Pennsylvania Application September 25, 1952, Serial No. 311,380

5 Claims. (Cl. 179—2.5)

My invention relates to systems for carrier current communication over power lines and in particular relates to a system which performs the dual function of voice communication and remote control of power equipment by relaying.

In modern power systems, the use of high-frequency carrier currents transmitted over the power-line conductors as a vehicle for voice communication has grown rapidly in recent years, a transmitter and receiver being located at each important station on the power system so that employees at such stations may communicate with each other at will. The use of so-called single-side-band systems in which one side band and the carrier are automatically suppressed at the transmitter have shown distinct superiority for most installations in this service. The use of relay systems in which a carrier current is varied to open and close circuit breakers controlling various apparatus units at distant, and frequently unattended, substations is likewise coming into more and more extended use.

Occasions arise when it becomes desirable to equip a station, which is already provided with voice communication apparatus, with a device such, for example, as a circuit breaker to be operated by a relay controlled by carrier current signals. The normal procedure, in such a case, would be to provide additional equipment to supply an added carrier current of different frequency from the voice communication carrier, and added receiving equipment for the new carrier. However, such added equipment is costly and any arrangement capable of effecting the desired results at reduced expense is greatly to be desired.

One object of my invention is, accordingly, to provide a new and improved system for voice communication and relay operation for electrical transmission lines.

Another object is to provide an existing carrier current voice transmission system with auxiliary equipment for operating carrier-current relays and the like by means of a minimum of added equipment.

Still another object is to provide an existing carrier current communication system with added means for performing carrier-current relaying and the like at a minimum of expense.

Other objects of my invention will become evident upon reading the following description taken in connection with drawings in which the single figure is a schematic diagram of one station equipped with my arrangment for adding the relaying function to a power line carrier voice-communication system.

Referring to the drawings in detail, a power-line 1 having conductors 2, 3, 4 is provided with coupling means 5 and 6 of conventional form, such as an inductor 7 bridged by a capacitor 8 grounded through a capacitor 9 and inductor 10, for exchanging carrier frequency power with a transmitter network 11 and a receiver network 12. The receiver network 12 embodies a voice receiver 13 which may be of a conventional type for amplitude modulated (hereafter called AM) carrier current reception, and a frequency shift (hereafter called FM) carrier current receiver 14 capable of demodulating carrier current code signals such as dash or dot combinations. The demodulated code signals could be connected to control any desired equipment; for instance, to trip or to close a circuit breaker.

The transmitter network 11 comprises a power amplifier 21 having its output impressed on the reactor 10 and its input connected to a pair of transformer secondaries 22, 23. The primary winding 24 which feeds secondary 22 is connected across diagonally opposite terminals 25, 26 of a ring-type modulator of well-known type embodying four copper oxide rectifiers. Sec. 7, par. 8 of Terman's Radio Engineer's Handbook, 1st ed., McGraw-Hill Co., New York, shows such modulators. The other diagonally opposite terminals 27, 28 of the ring are impressed through a secondary winding 29 with the voltage of a carrier-frequency oscillator 31 in the frequency-determining circuit of which is connected (through a switch 32) an ancillary reactor 33. When switch 32 is open, the frequency of oscillator 31 has a value C; when switch 32 is closed, its frequency is shifted to a different value $C+\Delta C$. Between mid-taps of the secondary 29 and the primary 24 is connected through a $-90°$ phase shift circuit 34 and a suitable audio-amplifier the voice signals with which it is desired to modulate the carrier wave for telephonic purposes.

The primary 41 associated with secondary 23 is connected across diagonally-opposite corners 42 and 43 of a second ring modulator of the copper oxide type, across the other corners 44, 45 of which is connected a secondary winding 46 having impressed across its primary, through a phase-shift network 36 producing a shift of $+90°$, the output of oscillator 31. The output of audio-amplifier 35 is impressed between the mid-taps of secondary 46 and primary 41. A direct-current source 47 and resistor 48 are provided by which the ring modulator feeding secondary 23 may be unbalanced to the degree desired, with the result that the carrier is not completely suppressed as it is in a perfectly balanced ring modulator.

By closing and opening the switch 32 in accordance with any desired code, the frequency of the carrier wave supplied to the transmission line 1 by network 11 may be shifted from value C to $C+\Delta C$, thereby impressing on that line an FM signal which may be picked up by the properly tuned FM receiver 14 at any distant station on the line, demodulated, and used to control apparatus responsive to that code through relays in ways familiar to transmission line engineers.

With switch 32 open, an audio-frequency signal of frequency A at amplifier 35 will cause to be impressed on the secondary winding 22 voltages of frequencies C, $(C+A)$ and $(C-A)$, while it will impress on secondary winding 23 voltages of frequencies C, $(C+A)$ and $(C-A)$, but with the voltage of frequency $(C-A)$ out of phase by 180 electrical degrees with the voltage of frequency $(C-A)$ in secondary 22, while the voltages of frequencies $(C+A)$ in the respective secondaries 22 and 23 are cophasal. By suitable adjustments of amplitude of these voltages, the voltages of frequency $(C-A)$ in the serially connected secondaries 22 and 23 may be made to neutralize each other so that only voltages of the carrier frequency C and one side band of frequency $(C+A)$ are impressed on transmission line 1 through coupling capacitor 9. These voltages may be demodulated in ways familiar to telephonic engineers to yield the voice signal in a conventional receiver.

When the switch 32 is closed, the secondary 22 has voltages of frequencies $(C+\Delta C)$, $(C+\Delta C+A)$ and $(C+\Delta C-A)$, while secondary 23 has voltages of frequencies $(C+\Delta C)$, $(C+\Delta C+A)$, and $(C+\Delta C-A)$; but as in the case considered above, the voltage of frequency $(C+\Delta C-A)$ in secondary 22 will be 180 electrical degrees out of phase with that in secondary 23 and cancels its effect, so that the voltage impressed on transmission line 1 through capacitor 9 has present only the frequencies $(C+\Delta C)$ and $(C+\Delta C+A)$. The value of the frequency shift $\Delta C$ is, as usual in FM communication, made small comparted to C (e. g., about 0.06 percent) and in this situation the same distant AM receiver which is tuned to demodulate the AM signals of carrier frequency C will demodulate the signals of frequencies $(C+\Delta C)$ and $(C+\Delta C+A)$. Speech may thus be received over my above-described system without substantial disturbance from the FM modulations of swing $\Delta C$ which are impressed for relaying purposes.

The frequency C of the carrier-oscillator 31 is, of course, different for each of the communication stations on transmission line 1, and the receivers 13 and 14 are tuned to receive the signals from the desired one of the distant transmitting stations.

One of the novel features of my invention is the suppression of one carrier side band but retention of a portion of the carrier and the other side band. It is understood that this could be done by means other than the specific one herein described. The side band to be suppressed may be changed by reversing the polarity of one of the secondaries 22, 23.

While I have shown my invention in only one form, it will be apparent to those skilled in the art that it is not so limited, but is susceptible of various changes and modifications without departing from the spirit thereof.

I claim as my invention:

1. A power-line carrier-current communication system in which signals are carried on a transmission line comprising a plurality of stations each having an amplitude modulation and a frequency modulation receiver and a transmitter comprising a carrier-generator, a first input-inductor energized by the output of said generator and having its terminals connected to two diagonally-opposite corners of a first ring-type modulator, a first output-inductor having its terminals connected to the other two diagonally-opposite corners of said first ring-type modulator, first means for impressing a signal frequency voltage between midtaps on said first input-inductor and said first output-inductor, a second input-inductor energized by said generator and having its terminals connected to two diagonally-opposite corners of a second ring-type modulator, a second output-inductor having its terminals connected to the other two diagonally-opposite corners of said second ring-type modulator, a second means for impressing said signal frequency voltage between mid-taps on said second input-inductor and said second-output inductor, means for producing a plus 90° phase shift in the energy fed from said generator to said second input-inductor, means for producing a minus 90° phase shift in the signal frequency voltage which is impressed between the mid-taps on said first input-inductor and said first output-inductor, means to couple said output-inductors in series to said transmission line, means for frequency modulating said carrier-current generator, and a source of direct current voltage connected between two diagonally opposite corners of one of said ring-type modulators for unbalancing the same.

2. A power-line carrier-current communication system comprising a plurality of stations each having an amplitude modulation and a frequency modulation receiver and a transmitter comprising a carrier-current generator, a first and a second input-inductor, a first and a second ring-type modulator having said first and second input-inductors respectively connected to a pair of diagonally-opposite corners, means for energizing said first and second input-inductors respectively with voltages in quadrature derived from said generator, a first and second output-inductor connected respectively to the other diagonally-opposite corners of said ring-type modulators, a source of signal voltage and means for deriving therefrom two voltages which are in quadrature and impressing them respectively between mid-taps on said first input- and output-inductors and between mid-taps on said second input- and output-inductors, variable reactance means for frequency-modulating said generator, and means for unbalancing one of said ring-type modulators.

3. In combination with a carrier-frequency generator, a first and a second input-inductor, a first and a second ring-type modulator having said first and second input-inductors respectively connected to a pair of diagonally-opposite corners, means for energizing said first and second input-inductors respectively with voltages in quadrature derived from said generator, a first and second output-inductor connected respectively to the other diagonally-opposite corners of said ring-type modulators, a source of signal voltage and means for deriving therefrom two voltages which are in quadrature and impressing them respectively between mid-taps on said first input- and output-inductors and between mid-taps on said second input- and output-inductors, means for frequency-modulating said generator, and a source of voltage for unbalancing one of said ring-type modulators.

4. A communication system comprising a plurality of stations each having an amplitude modulation and a frequency modulation receiver and a transmitter comprising a carrier-frequency generator, a first frequency-converter having the output voltage of said generator and an amplitude modulated signal voltage impressed on its input terminals, means to derive an output voltage having present frequencies equal to the sum and difference of said carrier frequency and said amplitude modulated signal frequency, a second frequency-converter having the output of said generator and said amplitude modulated signal voltage impressed on its input terminals, means to derive an output voltage having present said sum and difference frequencies but with one of the last-said sum and difference frequencies cophasal with the same frequency in the output of said first frequency-converter while the other of the last-said sum and difference frequencies is 180 electrical degrees out of phase with the same frequency in the output of said first frequency converter, means to impress the sum of said outputs on said transmission system, a variable reactance device adapted to frequency-modulate said carrier-frequency generator, and means for causing said second frequency-converter to have a voltage of said carrier-frequency in its output.

5. A communication system comprising a plurality of stations each having an amplitude modulation and a frequency modulation receiver and a transmitter comprising a carrier frequency generator, means including a pair of balanced modulators for modulating the output of said generator with an audio-frequency signal to produce upper and lower side-band signals, means for continuously suppressing one of said modulated side-bands and a selected portion only of said carrier frequency signal, and means for frequency shift-keying said generator, whereby the side-band signals may be used for voice communications while the carrier signal may simultaneously be used for relaying functions.

References Cited in the file of this patent

UNITED STATES PATENTS

| | | |
|---|---|---|
| Re. 23,258 | Lenehan | Aug. 22, 1950 |
| 2,103,847 | Hansell | Dec. 28, 1937 |
| 2,264,397 | Moore | Dec. 2, 1941 |
| 2,480,705 | Brian | Aug. 30, 1949 |
| 2,569,279 | Barton | Sept. 25, 1951 |
| 2,576,429 | Villard | Nov. 27, 1951 |
| 2,605,396 | Cheek | July 29, 1952 |